March 7, 1961 L. M. LITZ 2,974,013
BORON NITRIDE PRODUCTION
Filed Aug. 13, 1957

INVENTOR
LAWRENCE M. LITZ
BY John F. Hohmann
ATTORNEY

United States Patent Office 2,974,013
Patented Mar. 7, 1961

2,974,013
BORON NITRIDE PRODUCTION

Lawrence M. Litz, Lakewood, Ohio, assignor to Union Carbide Corporation, a corporation of New York Filed Aug. 13, 1957, Ser. No. 677,936

8 Claims. (Cl. 23—191)

This invention relates to a process for the preparation of boron nitride.

By "boron nitride" is hereinafter meant the hexagonal modification of the nitride of boron which is represented by the general chemical formula, BN. Boron nitride is a refractory material having unique electrical and lubricating properties. However, high production costs, and difficulties in purifying the product, have limited the industrial use of this material.

It is an object of this invention to provide an improved process for preparing boron nitride.

Other objects will be apparent from the disclosure and appended claims.

Figure 1:
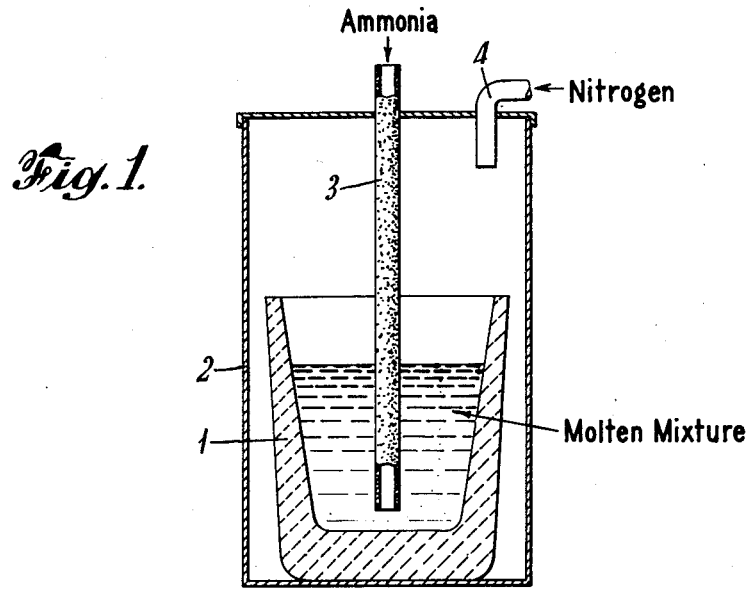

Figure 1 illustrates a reactor which is suitable for producing boron nitride according to the process of the subject invention. The reactor comprises a crucible 1, a container 2, ammonia tube 3 and inert gas tube 4.

Figure 2:
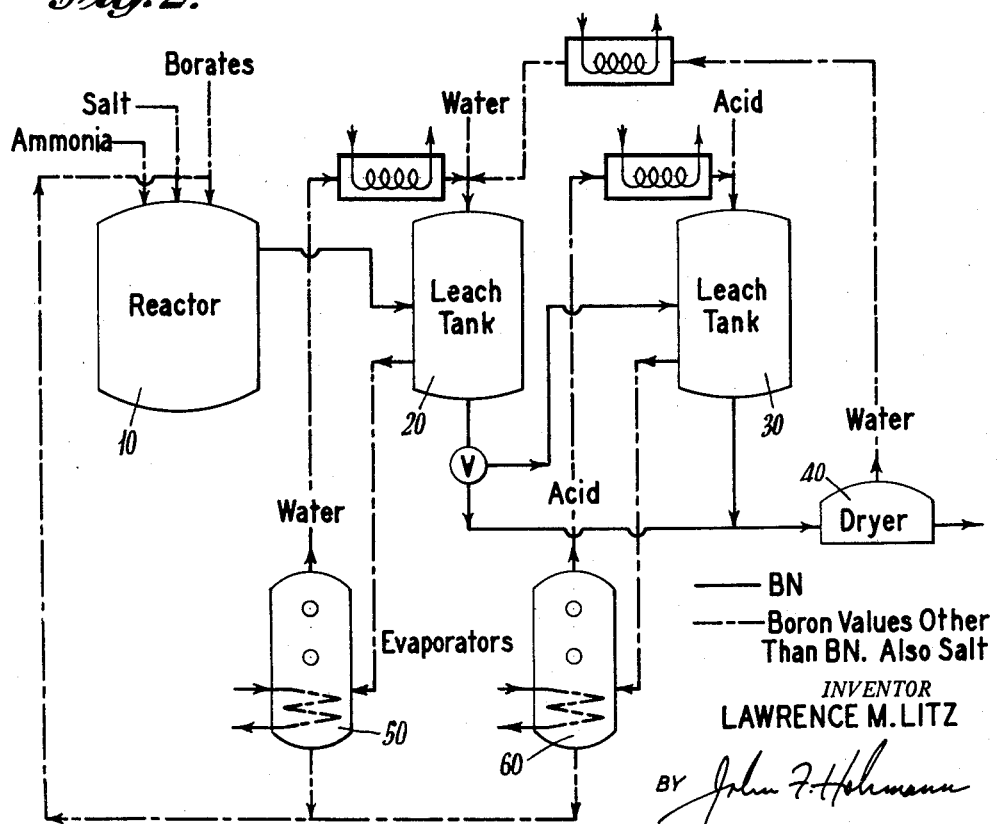

Figure 2 illustrates a flow diagram of a possible cyclic and continuous process for producing boron nitride in accordance with the subject invention.

The process which statisfies the objects of the present invention comprises the steps of dispersing a boron-containing reactant which is chemically equivalent to at least one member of the group consisting of acids of boron and anhydrides and metal salts thereof in a molten bath of at least one relatively non-volatile metal salt; introducing gaseous ammonia into the resultant dispersion, reacting the borron-containing reactant and ammonia to form boron nitride and separating the boron nitride from the reaction mixture. Included in the expression "a boron-containing reactant having a composition chemically equivalent to at least one member of the group consisting of acids of boron and anhydrides and metal salts thereof" are the boric acids, boric oxides, metal borates such as the sodium and calcium meta-, tetra-, and perborates and mixtures which are chemically equivalent to the metal borates such as mixtures of calcium oxide and boric oxide thereof, lead oxide and boric oxide. Potassium fluoborate has given excellent results. Best results have been obtained by employing a mixture of boric oxide and calcium oxide.

The vehicles for the boron-containing reactant i.e. the relatively non-volatile fused metal salts include the halides of sodium, potassium, calcium, lead and mixtures thereof and other metal salts which are relatively non-volatile and which are non-interfering in the nitride-forming process. Sodium chloride is the preferred vehicle for this process. The vehicle should be substantially non-volatile in order to avoid unnecessary loss by evaporation. The boron-containing reactant may be dipersed in the vehicle either by dissolving the reactant in the fused salt or forming a uniform suspension of the reactant in the fused salt.

Another desirable property of the vehicle for the boron-containing reactant is that it be water soluble. The boron nitride may then be separated from the vehicle by leaching the reaction product with water leaving the water-insoluble boron nitride in the residue.

Gaseous ammonia is passed into the molten reaction mixture through a tube extending below the surface of the mixture. Preferably a stroichiometric excess of ammonia should be introduced into the reaction mixture to insure complete reaction of the contained boron if batch operation is employed. Throughout the reaction the reaction mixture should be maintained at a temperature where the molten salt is fluid but not so high that there is excessive loss of salt by volatilization. Temperatures in the range of from 600° C. to 950° C. have been found to be generally satisfactory. A temperature in the range of 850° C. to 950° C. has been found preferable from a convenience standpoint. The reaction product i.e., boron nitride which is formed through the reaction mass tends to concentrate at the surface of the mass as a froth and may be easily skimmed from the surface.

The reaction product is removed from the reactor and the boron nitride is isolated. This isolation may be effected by crushing the solidified melt and subjecting the crushed material to an aqueous leach. The soluble materials are dissolved, leaving the water-insoluble boron nitride in the residue. Any insoluble borates, for example, calcium borate, which may be left in the residue may be dissolved in a dilute hydrochloric acid leach leaving a boron nitride residue of high purity.

If the aqueous and/or acid leaching is to be employed with a reaction product prepared from a sodium borate, special safety precautions should be observed since sodium cyanide may be a product contaminant. Hydrogen cyanide may be formed upon contact of the reaction product with water. This is even more likely when the product is leached with acid. Thus washing of the product should be done in a well-vented area. If the reaction product is to be treated with an acid, it should be thoroughly washed with water prior to leaching with acid.

The separation of the boron nitride from the reaction mixture is not limited to the leaching methods just described; any suitable means may be employed in accordance with the process of the present invention.

Figure 1 shows an apparatus which may be utilized in the process of the present invention. The apparatus comprises a crucible 1 inside a closed atmosphere-protecting container 2 with a tube 3 passing through container 2 into crucible 1 so that the exit of tube 3 is only slightly above the bottom of crucible 1, and tube 4 which passes through container 2 into the atmosphere above the crucible. Crucible 1 is charged with a mixture comprising the boron-containing reactant and the metal salt. The crucible is placed in container 2, the container is closed and the entire apparatus is placed in a furnace and heated. The charge melts and the boron-containing reactant may partially dissolve in the fused salt forming one or more liquid phases. When the solution is sufficiently fluid, ammonia is passed into the melt through tube 3. Upon conclusion of the reaction, the ammonia flow is stopped and a non-reactive gas is passed through tube 4 to flush out accumulated hydrogen. The assembly is then opened and the crucible removed. The melt is cooled, broken up, and subjected to the purification treatment discussed previously.

The materials of construction for the apparatus should be selected so as to be non-contaminating in the reaction mixture. For example, crucible 1 may be steel, carbon, or fire-clay of the type used for glass melting, tube 3 for the introduction of the ammonia may be steel or carbon and container 2 may be suitably selected from any of the alloys which resist attack by ammonia at elevated temperatures.

In the following examples, the apparatus described above was employed. However, this does not represent a limitation on the subject process, and any suitable apparatus may be employed.

Example I

A charge consisting of 500 grams of sodium chloride, 30 grams of boric oxide, and 12 grams of calcium oxide was melted and ammonia was passed through the melt for five hours. Throughout the reaction the temperature was maintained at about 900° C. The melt was cooled and the solidified mass was subjected to aqueous leaching. A recovery of 13.5 grams of boron nitride was realized which represented a yield of 63 percent based on the boric oxide charge.

Example II

A charge consisting of 150 grams of a sodium chloride-potassium chloride eutectic mixture, 30 grams of boric oxide, $B_2O_3$, and 12 grams of calcium oxide were melted, and ammonia was passed through the melt for six hours. The temperature was maintained at about 900° C. throughout the reaction. The melt was cooled and solidified. The solid mass was leached with water, washed with dilute acid, and dried. The recovery was 13.9 grams of boron nitride which represented a yield of 65 percent based on the boric oxide charge.

Example III

The passage of ammonia for 2 hours through a molten charge consisting of 150 grams of calcium chloride and 30 grams of orthoboric acid yielded 1.1 grams of boron nitride. The reaction temperature was about 800° C.

Example IV

A molten charge consisting of 200 grams of sodium chloride and 20 grams of sodium metaborate was treated with ammonia for 3 hours at a reaction temperature of 750° C. to yield 0.1 gram of boron nitride.

Example V

In another example of the invention a molten charge consisting of 30 grams of boric oxide, $B_2O_3$, 42.5 grams of barium carbonate, $BaCO_3$ and 500 grams of sodium chloride was treated with gaseous ammonia at a rate of 2 cubic feet per hour for approximately 4 hours at a temperature of approximately 850° C. Ten grams of boron nitride were produced which represented a yield of 47.6 percent based on the boric oxide charge.

Example VI

A molten charge consisting of 8.7 grams of magnesium oxide, 30 grams of boric oxide and 500 grams of sodium chloride was subjected to 2 cubic feet per hour of gaseous ammonia for 4 hours at a temperature of about 850° C. The yield was 6.4 grams of boron nitride which represented about 30 percent based on the boric oxide charge.

One very important advantage of the subject invention is that it permits the preparation of boron nitride by a continuous process. A large fraction of the boron nitride, admixed with some of the salt, tends to float on top of the melt as light froth. The froth may be skimmed from the top of the melt and fresh boric oxide added to the system in an amount corresponding to the product withdrawn. A continuous process is not generally feasible with prior techniques.

Another significant advantage of the present invention is found in the ease of recovery of the product from the solvent. The use of water and/or acid leaches requires only limited equipment and relatively inexpensive reagents. The product is obtained as a flocculant, readily filterable material. The unreacted borate and the occluded salts may be recovered merely by evaporating the leach liquors to dryness and adding the residue directly into the reactor.

From these considerations it may be seen that a cyclic and continuous process is possible for the production of boron nitride. Such a process is illustrated in the flow diagram of Figure 2. Make-up salt and the boron-containing reactant are fed into reactor 10 and fused therein. Ammonia is passed into the molten mass, and the boron nitride so produced is skimmed or floated or otherwise removed from the surface of the molten reaction mixture and fed into leach tank 20. Here the boron nitride is washed thoroughly with water to remove the water-soluble impurities. If the nitride is contaminated with water-insoluble impurities it may be further washed with acid in leach tank 30. The leached product in either case is passed into dryer 40 where the remaining water or acid is removed. The aqueous leach liquid is fed into evaporators 50, and the acid leach is fed into evaporator 60, where the water and acid are driven off. The residue consists of unreacted boron-containing reactant and salt which may be fed directly back into reactor 10. The evaporate from evaporator 50 and dryer 40 may be condensed and recycled to leach tank 20 and the evaporate from evaporator 60 condensed and returned to leach tank 30 if desired.

Not only does the process of the subject invention satisfy the need for an improved process for preparing boron nitride but in addition it provides a boron nitride of high density and high strength. Boron nitride has been prepared according to the subject process having a density in the range of 2.10 to 2.14 grams per cubic centimeter with a strength of about 15,000 pounds per square inch (when hot-pressed).

What is claimed is:

1. A process for preparing boron nitride which comprises dispersing in a molten bath of at least one relatively non-volatile metal halide selected from the group consisting of alkali metal halides and alkaline earth metal halides, a boron-containing reactant which is chosen from the group consisting of acids of boron, anhydrides and metal salts thereof, mixtures of calcium oxide and boric oxide, and mixtures of lead oxide and boric oxide thereby forming a molten reaction mixture; introducing gaseous ammonia into said resultant molten reaction mixture; reacting said boron containing reactant and ammonia while maintaining said molten reaction mixture at a temperature in the range of from about 600° C. to about 950° C. to form boron nitride, and separating the boron nitride from the reaction mixture.

2. A process in accordance with claim 1 wherein said boron-containing reactant and said ammonia are reacted while said molten reaction mixture is maintained at a temperature in the range of from 850° C. to 950° C.

3. A process in accordance with claim 2 wherein the water-soluble contaminants of the reaction product are removed by an aqueous leach and the water insoluble contaminants are removed from the reaction product by an aqueous acid leach.

4. A process for preparing boron nitride which comprises effecting the dispersion of a boron-containing reactant comprising a mixture of calcium oxide and boric oxide in a molten bath of a relatively non-volatile metal halide comprising sodium chloride thereby forming a molten reaction mixture; intimately contacting said resultant molten reaction mixture with gaseous ammonia; reacting the boron containing reactant and ammonia while maintaining said molten reaction mixture at a temperature in the range of from about 600° C. to 950° C. to form boron nitride; and separating the boron nitride from the reactant mixture.

5. A process in accordance with claim 4 wherein said boron-containing reactant and said ammonia are reacted while said molten reaction mixture is maintained at a temperature in the range of from 850 to 950° C.

6. A process for preparing boron nitride which comprises effecting a dispersion of a boron-containing reactant comprising a mixture of boric oxide and calcium oxide in a molten bath of a relatively non-volatile metal halide comprising sodium chloride thereby forming a molten reaction mixture; introducing gaseous ammonia into said molten reaction mixture; reacting the boron-containing reactant and ammonia while maintaining said molten reaction mixture at a temperature in the range of from about 850° C. to 950° C. to form boron nitride, removing water soluble contaminants from the reaction product by leaching the reaction product with water; removing water insoluble contaminants from the reaction product by leaching the reaction product with an aqueous acid, and drying the leached boron nitride.

7. A continuous process for producing boron nitride which comprises reacting gaseous ammonia with a boron-containing reactant which is chosen from the group consisting of acids of boron, anhydrides and metal salts thereof, mixtures of calcium oxide and boric oxide, and mixtures of lead oxide and boric oxide, which is dispersed in a molten bath of a relatively non-volatile metal halide selected from the group consisting of alkali metal halides and alkaline earth metal halides said reaction being carried on while said molten bath is maintained at a temperature in the range of about 600° C. to 950° C.; mechanically separating boron nitride from the molten metal halide bath; removing water-soluble impurities from said boron nitride by leaching it with water; removing water-insoluble impurities from said boron nitride by leaching it with an aqueous acid; drying the leached boron nitride; evaporating the leach liqueurs to substantial dryness; returning the residue of said evaporation to the molten metal halide bath; and repeating said steps to form additional quantities of boron nitride.

8. A process in accordance with claim 7 wherein said boron-containing reactant comprises a mixture of boric oxide and calcium oxide, said non-volatile metal halide is sodium chloride, and the temperature of said molten bath is maintained in the range of about 850° C. to 950° C. throughout the course of the nitride forming reaction.

References Cited in the file of this patent

UNITED STATES PATENTS 1,077,712    Heyder _____ Nov. 4, 1913

FOREIGN PATENTS 277,715    Great Britain _____ Dec. 20, 1928

OTHER REFERENCES

Mellor: "Comprehensive Treatise on Inorganic and Theoretical Chemistry," vol. 8, page 109.

"Boron Nitride—An Unusual Refractory," Gorden R. Finlay and Guy Fetterley, American Ceramic Society Bulletin, vol. 31, No. 4 (1952).